United States Patent
Yoshikawa et al.

(10) Patent No.: US 9,601,952 B2
(45) Date of Patent: Mar. 21, 2017

(54) MAGNET EMBEDDED ROTOR AND METHOD OF MANUFACTURING THE MAGNET EMBEDDED ROTOR

(71) Applicant: JTEKT CORPORATION, Osaka-shi, Osaka (JP)

(72) Inventors: Hiroshi Yoshikawa, Kadoma (JP); Akira Hiramitsu, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 152 days.

(21) Appl. No.: 14/174,180

(22) Filed: Feb. 6, 2014

(65) Prior Publication Data
US 2014/0225469 A1  Aug. 14, 2014

(30) Foreign Application Priority Data

Feb. 13, 2013 (JP) ................................ 2013-025769

(51) Int. Cl.
*H02K 15/03* (2006.01)
*H02K 21/12* (2006.01)
*H02K 1/27* (2006.01)
*H01F 13/00* (2006.01)

(52) U.S. Cl.
CPC ........... *H02K 1/274* (2013.01); *H01F 13/003* (2013.01); *H02K 1/2773* (2013.01); *H02K 15/03* (2013.01); *H02K 2201/15* (2013.01)

(58) Field of Classification Search
CPC ....... H02K 1/274; H02K 15/03; H02K 1/2773
USPC ............ 310/156.53, 156.01, 156.37, 156.38, 310/156.43, 156.56, 156.13, 216.025, 310/216.031, 216.035, 216.062, 216.069, 310/216.086, 112, 114; 29/598
See application file for complete search history.

(56) References Cited

U.S. PATENT DOCUMENTS 2,996,791 A * 8/1961 Hicks ..................... H02K 17/16
                                          29/598
4,339,874 A * 7/1982 Mc'Carty ............. H02K 1/278
                                          29/598

(Continued)

FOREIGN PATENT DOCUMENTS

EP       1 826 886 A2    8/2007
JP       2004-072978   * 3/2004

(Continued)

OTHER PUBLICATIONS

English translation for JP 2004072978.*

(Continued)

*Primary Examiner* — Quyen Leung
*Assistant Examiner* — Ahmed Elnakib
(74) *Attorney, Agent, or Firm* — Oliff PLC

(57) ABSTRACT

A magnet embedded rotor configured to provide an improved magnetization ratio of the field permanent magnets is provided. The magnet embedded rotor includes a first annular core in which first permanent magnets are embedded, and a second annular core in which second permanent magnets, which are independent from the first permanent magnets, are embedded. The magnet embedded rotor has a structure in which the second annular core is fitted onto the outer periphery of the first annular core. The first permanent magnets and the second permanent magnets constitute field permanent magnets.

6 Claims, 5 Drawing Sheets

(56) References Cited

U.S. PATENT DOCUMENTS

| | | | | |
|---|---|---|---|---|
| 4,725,750 | A | * | 2/1988 | Welch .................. H02K 1/2766 310/156.49 |
| 5,684,352 | A | * | 11/1997 | Mita ........................ H02K 1/02 310/152 |
| 6,563,246 | B1 | * | 5/2003 | Kajiura .................. B60K 6/26 310/114 |
| 6,630,762 | B2 | * | 10/2003 | Naito ..................... H02K 15/03 310/156.53 |
| 2002/0047409 | A1 | * | 4/2002 | Hiroyuki ................ H02K 15/03 310/100 |
| 2003/0025415 | A1 | * | 2/2003 | Hino ..................... H02K 15/03 310/156.56 |
| 2003/0209950 | A1 | | 11/2003 | Biais et al. |
| 2004/0041485 | A1 | * | 3/2004 | Horber .................. H02K 21/16 310/156.43 |
| 2005/0231057 | A1 | * | 10/2005 | Kloepzig ............. H02K 1/2733 310/156.56 |
| 2007/0273235 | A1 | * | 11/2007 | Kaizuka ............... H02K 21/029 310/156.53 |
| 2011/0057533 | A1 | | 3/2011 | Murakami et al. |

FOREIGN PATENT DOCUMENTS

| | | | |
|---|---|---|---|
| JP | 2008-017634 | A | 1/2008 |
| JP | 2009-171764 | * | 7/2009 |
| JP | A-2010-193587 | | 9/2010 |
| JP | 2011-078298 | A | 4/2011 |
| JP | 2011-155740 | * | 8/2011 |

OTHER PUBLICATIONS

JP 2004-072978; Mar. 2004; Masahiro et al.; Japan.*
Feb. 12, 2016 European Search Report issued in European Application No. 14154277.9.
Oct. 4, 2016 Notice of Reasons for Rejection issued in Japanese Patent Application No. 2013-025769.

* cited by examiner

MAGNET EMBEDDED ROTOR AND METHOD OF MANUFACTURING THE MAGNET EMBEDDED ROTOR

INCORPORATION BY REFERENCE

The disclosure of Japanese Patent Application No. 2013-025769 filed on Feb. 13, 2013 including the specification, drawings and abstract is incorporated herein by reference in its entirety.

BACKGROUND OF THE INVENTION

1. Field of the Invention

The invention relates to a magnet embedded rotor and a method of manufacturing the magnet embedded rotor.

2. Description of the Related Art

There has been known an interior permanent magnet motor (IPM motor) having a structure in which field permanent magnets are embedded in a rotor. As a method of manufacturing a magnet embedded rotor used in such an IPM motor, a method described in Japanese Patent Application Publication No. 2010-193587 (JP 2010-193587 A) has been known. In this method, a cylindrical rotor having a plurality of magnet insertion holes is prepared, magnetic bodies are embedded in the magnet insertion holes, and then a magnetizing device is arranged so as to cover the outer periphery of the rotor. Then, magnetic flux is supplied to the inside of the rotor from the outer peripheral face of the rotor by the magnetizing device, so that the magnetic bodies embedded in the rotor are magnetized to be turned into filed permanent magnets.

As described in JP 2010-193587 A, when the magnetic flux is supplied from the outer peripheral face of the rotor, the amount of magnetic flux that can be supplied to the magnetic bodies embedded in the rotor is determined based on the surface area of the outer peripheral face of the rotor and the amount of magnetic flux per unit area, which can be supplied by the magnetizing device. There is a limit on the amount of magnetic flux per unit area, which can be supplied by the magnetizing device. Therefore, if the area of the outer peripheral face of the rotor is small relative to the area of the surfaces of the magnetic bodies to be magnetized, it is difficult to supply a sufficient amount of magnetic flux to the magnetic bodies. As a result, the magnetization ratio of the permanent magnets decreases.

When the magnetic flux is supplied from the outer peripheral face of the rotor, a radially inside portion of the rotor is supplied with a smaller amount magnetic flux than a radially outside portion of the rotor. Therefore, when the magnetic bodies are embedded in a radially inside portion of the rotor, it is difficult to supply a sufficient amount of magnetic flux to the magnetic bodies. As a result, the magnetization ratio of the permanent magnets decreases.

If the magnetization ratio of the permanent magnets decreases due to these factors, a sufficient amount of magnetic flux is not generated by the permanent magnets, and thus the magnetic flux density in the outer peripheral face of the rotor decreases. This leads to a reduction in the amount of effective magnetic flux interlinking with a stator coil of a motor, and constitutes a factor causing a decrease in the motor output torque.

SUMMARY OF THE INVENTION

One object of the invention is to provide a magnet embedded rotor configured such that the magnetization ratio of field permanent magnets is improved, and a method of manufacturing the magnet embedded rotor.

A magnet embedded rotor according to an aspect of the invention includes a first annular core in which first permanent magnets are embedded, and a second annular core in which second permanent magnets independent from the first permanent magnets are embedded, and which is fitted onto an outer periphery of the first annular core. The first permanent magnets and the second permanent magnets constitute filed permanent magnets.

With the above-described structure, it is possible to individually carry out a magnetization of the magnetic bodies embedded in the first annular core to turn the magnetic bodies into the first permanent magnets and the magnetization of the magnetic bodies embedded in the second annular core to turn the magnetic bodies into the second permanent magnets. If the steps of magnetizing the annular cores are individually carried out, it is possible to supply magnetic flux from each of the outer peripheral face of the first annular core and the outer peripheral face of the second annular core. Therefore, it is possible to supply a sufficient amount of magnetic flux to the magnetic bodies embedded in each of the annular cores.

The above-described structure is considerably effective in that a sufficient amount of magnetic flux can be supplied to the magnetic bodies in the first annular core that is located at the radially inner side of the rotor, that is, a portion that is less likely to be supplied with a sufficient amount of magnetic flux. If a sufficient amount of magnetic flux can be supplied to the magnetic bodies embedded in each annular core, it is possible to magnetize the permanent magnets in each annular core at a sufficient level. As a result, it is possible to improve the magnetization ratio of the field permanent magnets.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
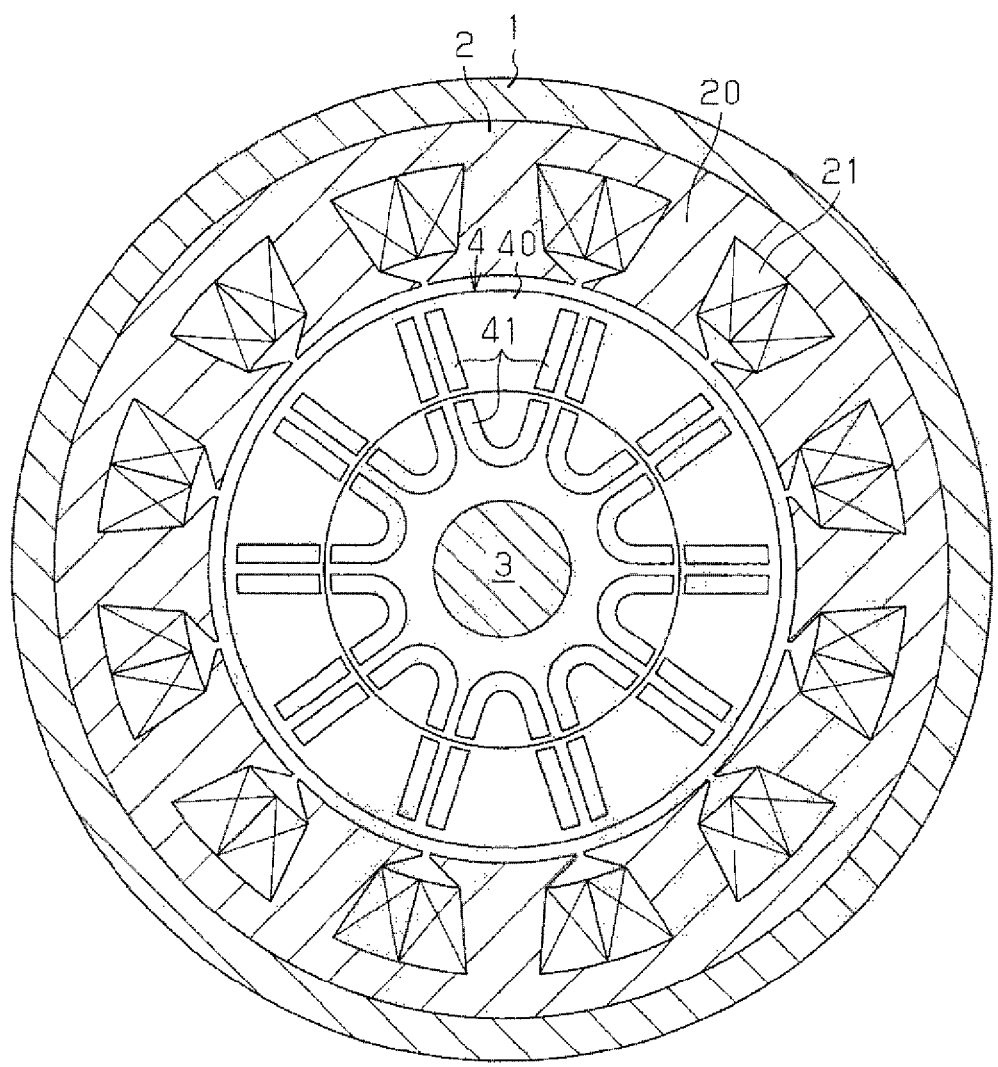
FIG. 1 is a sectional view illustrating the sectional structure of an IPM motor including a magnet embedded rotor according to an embodiment of the invention.

Hereinafter, a magnet embedded rotor according to an embodiment of the invention will be described. First, the structure of an IPM motor including the magnet embedded rotor according to the present embodiment will be described with reference to FIG. 1. As illustrated in FIG. 1, the IPM motor includes a cylindrical stator 2 fixed to the inner peripheral face of a housing 1, an output shaft 3 rotatably supported by the housing 1 via bearings (not illustrated), and a rotor 4 fixedly fitted to the outer periphery of the output shaft 3.

The stator 2 has a structure in which multiple magnetic steel plates are laminated in its axial direction. Twelve teeth 20, which extend radially inward, are formed on the inner peripheral face of the stator 2. Stator coils 21 are wound around the respective teeth 20.

Figure 2:
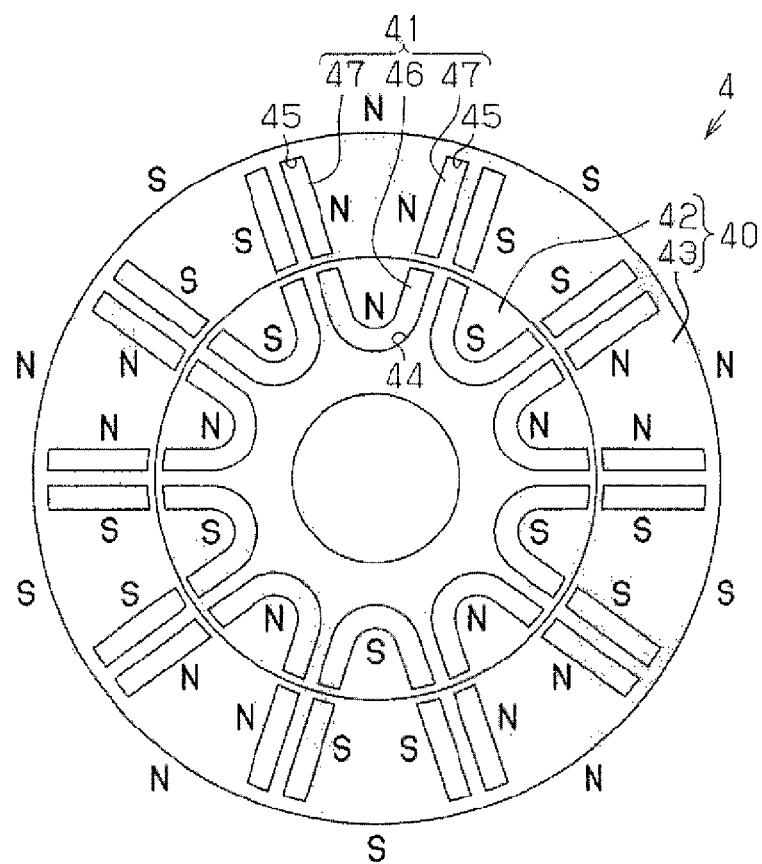
FIG. 2 is a plan view illustrating the planar structure of the magnet embedded rotor according to the embodiment.

The rotor 4 includes a cylindrical rotor core 40 and ten sets of U-shaped field permanent magnets 41 embedded in the rotor core 40. As illustrated in FIG. 2, the rotor core 40 includes a first annular core 42 and a second annular core 43 fitted onto the outer periphery of the first annular core 42. That is, the rotor core 40 has a radially bi-split structure formed by fitting the first annular core 42 and the second annular core 43 together in the radial direction. Each of the first annular core 42 and the second annular core 43 is formed by laminating multiple magnetic steel plates in its axial direction.

Figure 3:
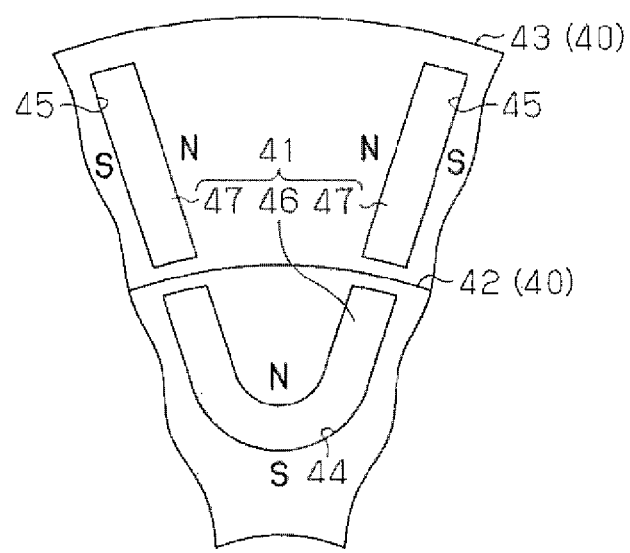
FIG. 3 is an enlarged plan view illustrating the structure of a field permanent magnet and its surroundings in the magnet embedded rotor according to the embodiment.

Ten first magnet insertion holes 44 are formed in the first annular core 42 at equal angular intervals so as to pass through the first annular core 42 in its axial direction. Each of the first magnet insertion holes 44 has a U-shape in a cross section orthogonal to the axial direction of the first annular core 42. As illustrated in FIG. 3, U-shaped first permanent magnets 46, which are bond magnets, are inserted in the respective first magnet insertion holes 44. Each of the first permanent magnets 46 is magnetized such that an inner portion of the U-shape and an outer portion of the U-shape differ in polarity. As illustrated in FIG. 2, in the first annular core 42, the first permanent magnets 46, each of which is magnetized such that the inner portion of the U-shape is the north pole, and the first permanent magnets 46, each of which is magnetized such that the inner portion of the U-shape is the south pole, are arranged alternately in the circumferential direction.

Ten sets of second magnet insertion holes 45 are formed in the second annular core 43 at equal angular intervals so as to pass through the second annular core 43 in its axial direction. The second magnet insertion holes 45 in each set make a pair of second magnet insertion holes 45 that are opposed to each other in the circumferential direction. The second magnet insertion holes 45 in each pair are located on lines that are extended outward in the radial direction of the first annular core 42, from two arm portions of a corresponding one of the U-shaped first magnet insertion holes 44, and each have a linear shape in a cross section orthogonal to the axial direction of the second annular core 43. A pair of linear second permanent magnets 47, which are bond magnets, is inserted in a corresponding pair of the second magnet insertion holes 45. As illustrated in FIG. 3, the second permanent magnets 47 are magnetized such that opposed portions of the permanent magnets in each pair and portions on the opposite sides of the permanent magnets from the opposed portions differ in polarity. As illustrated in FIG. 2, in the second annular core 43, some pairs of the second permanent magnets 47, which are magnetized such that the opposed portions are the north poles, and the remaining pairs of second permanent magnets 47, which are magnetized such that the opposed portions are the south poles, are arranged alternately in the circumferential direction.

In the rotor core 40, the first permanent magnets 46 in the first annular core 42 and the second permanent magnets 47 in the second annular core 43 constitute the U-shaped field permanent magnets 41. Due to the field permanent magnets 41, the rotor core 40 has a ten pole structure in which the north poles and the south poles are formed in an outer peripheral portion of the rotor core 40 so as to be arranged alternately in the circumferential direction.

In the IPM motor configured as described above, when three-phase alternate currents are supplied to the stator coils 21, a rotating magnetic field is generated. Under interaction between the rotating magnetic field and a magnetic field generated by the field permanent magnets 41, torque is applied to the rotor 4 to rotate the output shaft 3.

Figure 4:
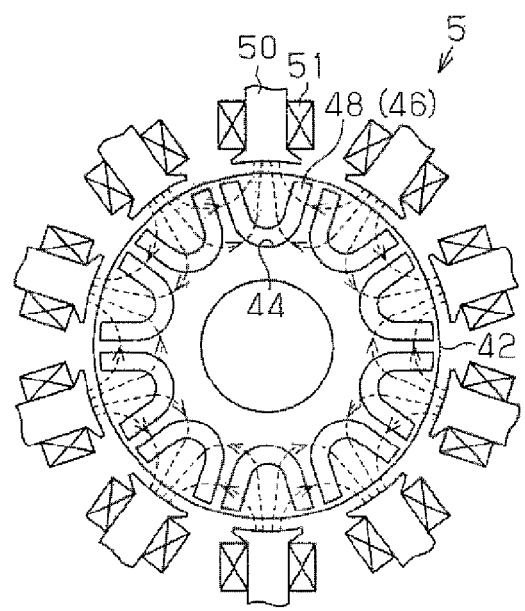
FIG. 4 is a plan view schematically illustrating a step of magnetizing a first annular core in a method of manufacturing the magnet embedded rotor according to the embodiment.
Figure 5:
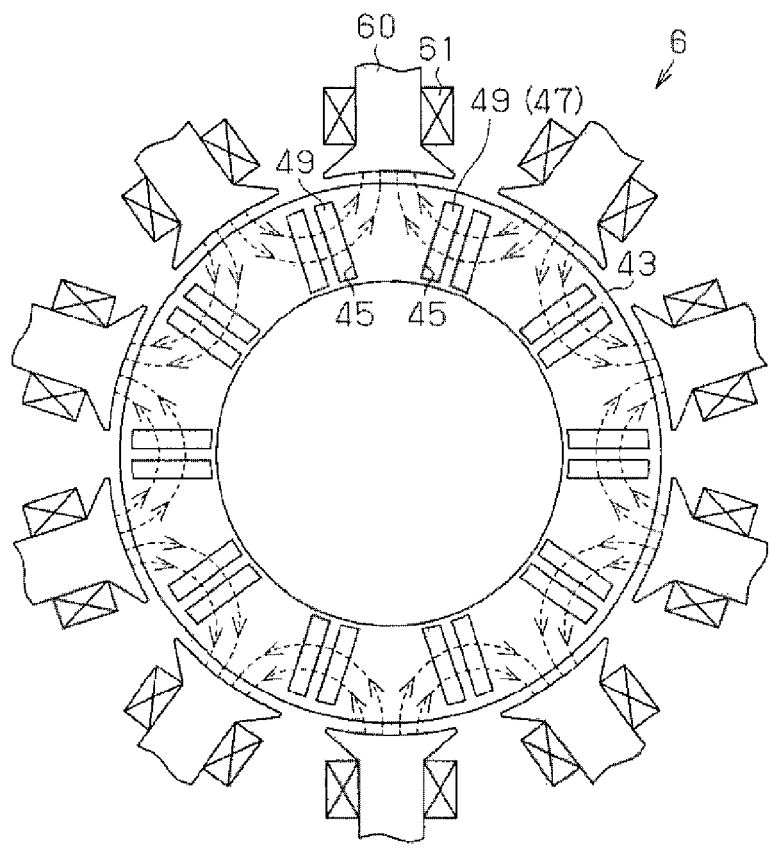
FIG. 5 is a plan view schematically illustrating a step of magnetizing a second annular core in the method of manufacturing the magnet embedded rotor according to the embodiment.

Next, a method of manufacturing the rotor 4 and the operation of the rotor 4 will be described. During manufacturing of the rotor 4, first, multiple magnetic steel plates are laminated to form each of the first annular core 42 and the second annular core 43. Then, as illustrated in FIG. 4, magnetic bodies 48 are embedded in the first magnet insertion holes 44 of the first annular core 42 by injection molding, and, as illustrated in FIG. 5, magnetic bodies 49 are embedded in the second magnet insertion holes 45 of the second annular core 43 by injection molding. Then, a step of magnetizing the first annular core 42 and a step of magnetizing the second annular core 43 are individually carried out.

As illustrated in FIG. 4, a first magnetizing device 5 is arranged so as to surround the outer peripheral face of the first annular core 42. The first magnetizing device 5 includes ten magnetizing yokes 50 that are arranged around the outer peripheral face of the first annular core 42, and magnetizing coils 51 wound around the respective magnetizing yokes 50. The magnetizing yokes 50 are arranged so as to be opposed to the outer peripheral faces of portions of the first annular core 42, the portions being interposed between arm portions of the U-shaped magnetic bodies 48. When currents are supplied to the magnetizing coils 51 from a power source (not illustrated), the first magnetizing device 5 generates magnetic flux that connects the magnetizing yokes 50 that are adjacent to each other via the first annular core 42, as indicated by the broken lines in FIG. 4. The magnetic bodies 48 are magnetized by the magnetic flux to be turned into the first permanent magnets 46.

As illustrated in FIG. 5, the second annular core 43 is magnetized by a second magnetizing device 6 in a step similar to the above-described magnetizing step. The second magnetizing device 6 includes ten magnetizing yokes 60 that are arranged around the outer peripheral face of the second annular core 43, and magnetizing coils 61 wound around the respective magnetizing yokes 60. The magnetizing yokes 60 are arranged so as to be opposed to the outer peripheral faces of portions of the second annular core 43, each of the portions being interposed between the corresponding pair of the magnetic bodies 49. The second magnetizing device 6 generates magnetic flux as indicated by the broken lines in FIG. 5 based upon currents supplied to the magnetizing coils 61. Thus, the magnetic bodies 49 in the second annular core 43 are magnetized to be turned into the second permanent magnets 47.

Figure 6:
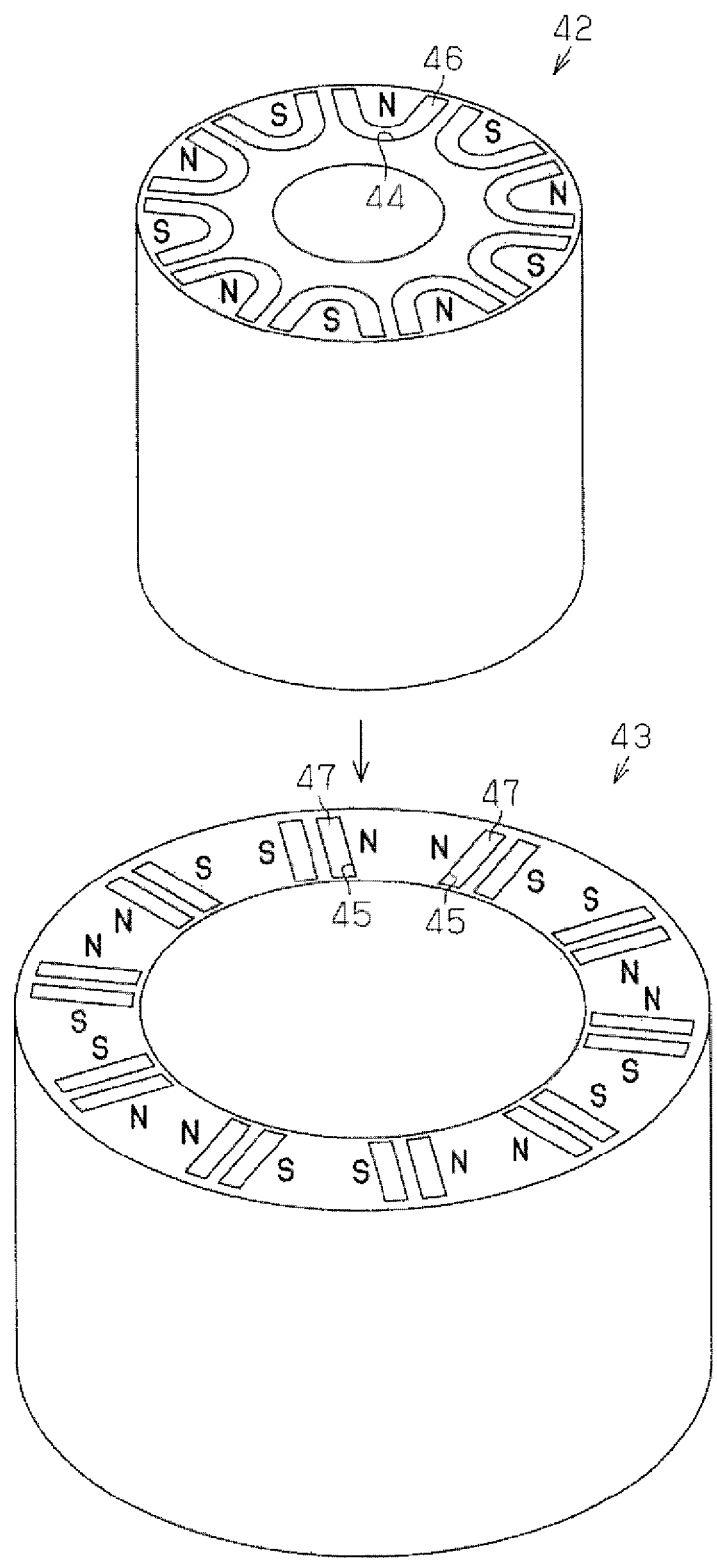
FIG. 6 is a perspective view illustrating a step of fitting the first annular core and the second annular core to each other in the method of manufacturing the magnet embedded rotor according to the embodiment.

Then, as illustrated in FIG. 6, the second annular core 43 is fitted onto the outer periphery of the first annular core 42, for example, by press-fitting, so that the first annular core 42 and the second annular core 43 are fitted together. The relative positions of the first annular core 42 and the second annular core 43 in the rotational direction are set such that one first permanent magnet 46 and two second permanent magnets 47 form a U-shape as a whole and the magnetic pole formed on the outer peripheral face of the first annular core 42 by the first permanent magnet 46 has the same polarity as the magnetic pole formed on the outer peripheral face of the second annular core 43 by the corresponding second permanent magnets 47. Thus, manufacturing of the rotor 4 in which the U-shaped field permanent magnets 41 are embedded is completed.

If the step of magnetizing the magnetic bodies 48 embedded in the first annular core 42 and the step of magnetizing the magnetic bodies 49 embedded in the second annular core 43 are individually carried out as described above, the magnetic flux can be supplied from the outer peripheral face of the first annular core 42 and the outer peripheral face of the second annular core 43. Therefore, sufficient amounts of magnetic flux can be supplied to the magnetic bodies 48, 49 that are embedded in the first annular core 42 and the second annular core 43, respectively. If such a magnetizing method is employed, as illustrated in FIG. 4, the distance between the magnetic bodies 48 in the first annular core 42 located at the radially inner side of the rotor 4 and the magnetizing yokes 50 is considerably reduced. Thus, sufficient amounts of magnetic flux can be supplied to the magnetic bodies 48 which are located at the radially inner side of the rotor 4 and which are less likely to be supplied with a sufficient amount of magnetic flux in the conventional technique.

The permanent magnets 46, 47 respectively embedded in the annular cores 42, 43 can be sufficiently magnetized because sufficient amounts of magnetic flux can be supplied to the magnetic bodies 48, 49 embedded in the annular cores 42, 43. As a result, the magnetization ratio of the field permanent magnets 41 can be improved. Thus, it is possible to provide a higher-power IPM motor or a more compact IPM motor.

The rotor 4 in the present embodiment produces the following advantageous effects. The rotor 4 is formed of the first annular core 42 in which the first permanent magnets 46 are embedded, and the second annular core 43 in which the second permanent magnets 47 that are independent from the first permanent magnets 46 are embedded. The second annular core 43 is fitted onto the outer periphery of the first annular core 42, so that the first permanent magnets 46 and the second permanent magnets 47 constitute the field permanent magnets 41. Thus, it is possible to improve the magnetization ratio of the field permanent magnets 41.

Figure 7:
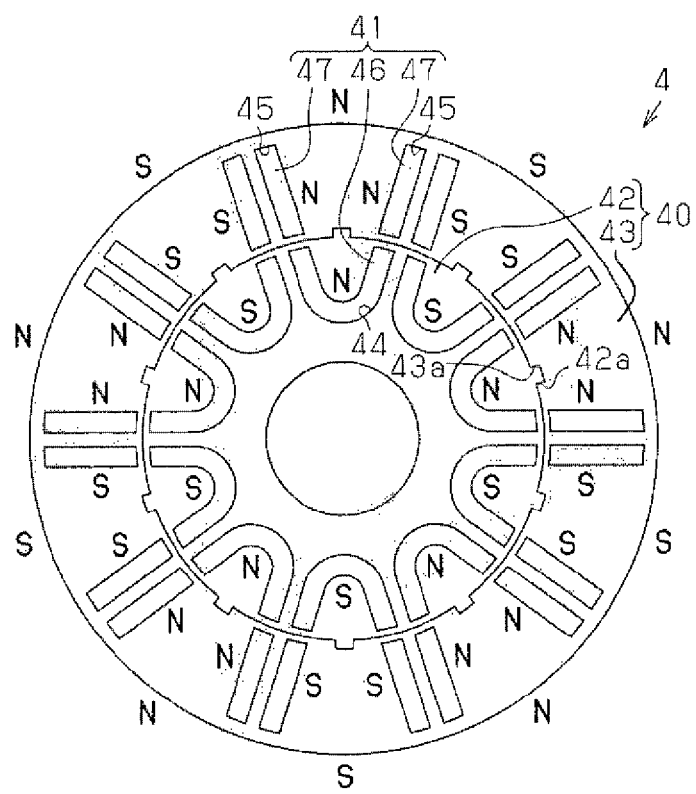
FIG. 7 is a plan view illustrating the planar structure of a magnet embedded rotor according to another embodiment of the invention.

Note that the above-described embodiment may be modified as follows, that is, the invention may be implemented in the following embodiments. An engagement structure may be formed on each of the fitting face of the first annular core 42 and the fitting face of the second annular core 43, and the first annular core 42 and the second annular core 43 may be engaged with each other in the circumferential direction of the rotor 4 by the engagement structures. For example, as illustrated in FIG. 7, protrusions 42a that protrude radially outward are formed on the outer peripheral face of the first annular core 42, which serves as the fitting face of the first annular core 42. Further, recesses 43a that are engaged with the protrusions 42a are formed in the inner peripheral face of the second annular core 43, which serves as the fitting face of the second annular core 43. With the provision of the engagement structures formed of the protrusions 42a and the recessed 43a, it is possible to prevent the first annular core 42 and the second annular core 43 from being misaligned in the circumferential direction. That is, the first permanent magnets 46 and the second permanent magnets 47 are prevented from being misaligned in the circumferential direction. Thus, it is possible to accurately locate and maintain the magnetic flux of the field permanent magnets 41 formed of the first permanent magnets 46 and the second permanent magnets 47, thereby ensuring high motor output torque.

In the above-described embodiment, each of the annular cores, 42, 43 has a laminated structure formed by laminating multiple magnetic steel plates. Alternatively, each of the annular cores 42, 43 may be formed of a single magnetic steel plate. Further alternatively, instead of the magnetic steel plates, magnetic soft iron may be used as the material of the annular cores 42, 43.

In the above-described embodiment, bond magnets are used as the first permanent magnets 46 and the second permanent magnets 47. Alternatively, for example, sintered magnets may be used as the first permanent magnets 46 and the second permanent magnets 47. In the above-described embodiment, each of the field permanent magnets 41 is formed in a U-shape with rounded corners. However, the shape of the field permanent magnets 41 is not limited to a U-shape with rounded corners. For example, each of the field permanent magnets 41 may be formed in a V-shape or in a U-shape with square corners. The shape of the first permanent magnets 46 and the shape of the second permanent magnets 47 may be changed as needed in accordance with the shape of the field permanent magnets 41.

In the above-described embodiment, the rotor core 40 is formed of the two annular cores 42, 43. Alternatively, the rotor core 40 may be formed of three or more annular cores. That is, the number of annular cores that constitute the rotor core 40 may be changed as needed.

In the above-described embodiment, the first magnetizing device 5 and the second magnetizing device 6 respectively include the magnetizing coils 51, 61 for generating the magnetic flux for magnetizing the magnetic bodies. Alternatively, the first magnetizing device 5 and the second magnetizing device 6 may include, for example, permanent magnets for generating magnetic flux for magnetizing the magnetic bodies.

In the above-described embodiment, the rotor 4 has ten magnetic poles. However, the number of magnetic poles of the rotor 4 is not particularly limited, that is, the number of magnetic poles may be changed as needed. The shape of the first annular core 42 and the shape of the second annular core 43 may be changed in accordance with the number of magnetic poles, or the numbers or shapes of the first permanent magnets 46 and the second permanent magnets 47 may be changed in accordance with the number of magnetic poles.

What is claimed is:

1. A magnet embedded rotor comprising:
   a first annular core in which first permanent magnets are embedded only in the first annular core; and
   a second annular core in which second permanent magnets independent from the first permanent magnets are embedded only in the second annular core, and which is fitted onto an outer periphery of the first annular core, wherein:
   the first permanent magnets and the second permanent magnets together constitute a plurality of field permanent magnets that are U-shaped;
   the first annular core and the second annular core are configured to rotate together without rotating relative to each other;
   the plurality of field permanent magnets are embedded in a circumferential arrangement within the rotor;
   the first permanent magnets are substantially U-shaped; and the second permanent magnets are aligned with arm portions of the first permanent magnets to form the U-shaped field permanent magnets.

2. The magnet embedded rotor according to claim 1, wherein an engagement structure is formed on each of a fitting face of the first annular core and a fitting face of the second annular core, and the first annular core and the second annular core are engaged with each other in a circumferential direction of each of the annular cores by the engagement structures.

3. The magnet embedded rotor according to claim 1, wherein the first annular core and the second annular core are fixedly fitted to prevent rotation relative to each other.

4. A method of manufacturing a magnet embedded rotor, comprising:
magnetizing magnetic bodies embedded in a first annular core to turn the magnetic bodies into first permanent magnets;
magnetizing magnetic bodies embedded in a second annular core to turn the magnetic bodies into second permanent magnets; and
fitting the second annular core that has only the second permanent magnets onto an outer periphery of the first annular core that has only the first permanent magnets to form a plurality of field permanent magnets that are U-shaped from the first permanent magnets and the second permanent magnets, wherein:
the first annular core and the second annular core are configured to rotate together without rotating relative to each other;
the plurality of field permanent magnets are embedded in a circumferential arrangement within the rotor;
the first permanent magnets are substantially U-shaped; and
the second permanent magnets are aligned with arm portions of the first permanent magnets to form the U-shaped field permanent magnets.

5. The method according to claim 4, wherein an engagement structure is formed on each of a fitting face of the first annular core and a fitting face of the second annular core, and the first annular core and the second annular core are engaged with each other in a circumferential direction of each of the annular cores by the engagement structures.

6. The method according to claim 4, wherein the first annular core and the second annular core are fixedly fitted to prevent rotation relative to each other.

* * * * *